US 11,425,378 B2

(12) United States Patent
Chiang et al.

(10) Patent No.: US 11,425,378 B2
(45) Date of Patent: Aug. 23, 2022

(54) METHOD AND APPARATUS OF TRANSFORM TYPE ASSIGNMENT FOR INTRA SUB-PARTITION IN VIDEO CODING

(71) Applicant: MEDIATEK INC., Hsinchu (TW)

(72) Inventors: Man-Shu Chiang, Hsinchu (TW); Chih-Wei Hsu, Hsinchu (TW)

(73) Assignee: HFI INNOVATION INC., Zhubei (TW)

( * ) Notice: Subject to any disclaimer, the term of this patent is extended or adjusted under 35 U.S.C. 154(b) by 0 days.

(21) Appl. No.: 17/426,081

(22) PCT Filed: Jan. 22, 2020

(86) PCT No.: PCT/CN2020/073845
§ 371 (c)(1),
(2) Date: Jul. 27, 2021

(87) PCT Pub. No.: WO2020/156454
PCT Pub. Date: Aug. 6, 2020

(65) Prior Publication Data
US 2022/0046240 A1 Feb. 10, 2022

Related U.S. Application Data

(60) Provisional application No. 62/813,810, filed on Mar. 5, 2019, provisional application No. 62/799,127, filed on Jan. 31, 2019.

(51) Int. Cl.
H04N 19/119 (2014.01)
H04N 19/159 (2014.01)
(Continued)

(52) U.S. Cl.
CPC ......... *H04N 19/119* (2014.11); *H04N 19/159* (2014.11); *H04N 19/176* (2014.11); *H04N 19/61* (2014.11)

(58) Field of Classification Search
CPC .... H04N 19/159; H04N 19/119; H04N 19/61; H04N 19/176
See application file for complete search history.

(56) References Cited

U.S. PATENT DOCUMENTS 9,532,058 B2   12/2016  Chien et al.
9,900,610 B2   2/2018   Song et al.
(Continued)

FOREIGN PATENT DOCUMENTS

CN    101888549 A    11/2010
CN    102740077 A    10/2012
(Continued)

OTHER PUBLICATIONS

International Search Report and Written Opinion dated Apr. 21, 2020, issued in application No. PCT/CN2020/073876.
(Continued)

Primary Examiner — Jessica M Prince
(74) Attorney, Agent, or Firm — McClure, Qualey & Rodack, LLP

(57) ABSTRACT

A method and apparatus of prediction for video coding are disclosed. According to the method, when the Intra Sub-Partition (ISP) mode is applied to a block, the block is partitioned into multiple sub-blocks horizontally or vertically. A target horizontal transform and a target vertical transform are determined from a candidate transform set for each of the multiple sub-blocks according to a target setting belonging to a setting group comprising unified setting and block setting. The target horizontal transform and the target vertical transform selected are then applied to each of the multiple sub-blocks. According to another method, a target horizontal and vertical transform are determined from a candidate transform set without a transform index for the current block according to unified setting, wherein the
(Continued)

unified setting comprises two or more Intra modes or Intra-related modes.

22 Claims, 7 Drawing Sheets

(51) Int. Cl.
*H04N 19/176* (2014.01)
*H04N 19/61* (2014.01)

(56) References Cited

U.S. PATENT DOCUMENTS

| | | | |
|---|---|---|---|
| 10,554,970 | B2 | 2/2020 | Moriya et al. |
| 10,587,897 | B2 | 3/2020 | Qu et al. |
| 2013/0266070 | A1 | 10/2013 | Sato |
| 2015/0117535 | A1 | 4/2015 | Li et al. |
| 2015/0208090 | A1* | 7/2015 | Sakakibara ............ H04N 19/14 375/240.12 |
| 2016/0381359 | A1 | 12/2016 | Kim et al. |
| 2018/0376137 | A1 | 12/2018 | Jun et al. |
| 2020/0351511 | A1* | 11/2020 | Ahn ........................ H04N 19/60 |
| 2021/0136373 | A1* | 5/2021 | De Luxán Hernández ................. H04N 19/593 |
| 2021/0203933 | A1* | 7/2021 | Rosewarne ............ H04N 19/60 |
| 2021/0227260 | A1* | 7/2021 | Lee ........................ H04N 19/132 |
| 2021/0266581 | A1* | 8/2021 | Jung ........................ H04N 19/60 |
| 2021/0360240 | A1* | 11/2021 | Lee ........................ H04N 19/105 |

FOREIGN PATENT DOCUMENTS

| | | |
|---|---|---|
| CN | 103004198 A | 3/2013 |
| CN | 106375765 A | 2/2017 |
| CN | 106998473 A | 8/2017 |
| TW | 201642656 A | 12/2016 |
| WO | 2015/006884 A1 | 1/2015 |
| WO | 2017/086738 A1 | 5/2017 |

OTHER PUBLICATIONS

Zhang, L., et al.; "CE4: History-based Motion Vector Prediction (Test 4.4.7);" Joint Video Experts Team (JVET) of ITU-T SG 16 WP 3 and ISO/IEC JTC 1/SC 29/WG 11; Oct. 2018; pp. 1-158.

Chinese language office action dated Mar. 30, 2021, issued in application No. TW 109102601.

Toma, T., et al.; "Description of SDR video coding technology proposal by Panasonic;" Joint Video Experts Team (JVET) of ITU-T SG 16 WP 3 and ISO/IEC JTC 1/SC 29/WG 11; Apr. 2018; pp. 1-169.

International Search Report and Written Opinion dated Apr. 26, 2020, issued in application No. PCT/CN2020/073845.

Chinese language Notice of Allowance dated Jun. 21, 2021, issued in application No. TW 109102600.

* cited by examiner ously determined reference index ref0' in list 1. After that,

METHOD AND APPARATUS OF TRANSFORM TYPE ASSIGNMENT FOR INTRA SUB-PARTITION IN VIDEO CODING

CROSS REFERENCE TO RELATED APPLICATIONS

The present invention claims priority to U.S. Provisional Patent Application, Ser. No. 62/799,127, filed on Jan. 31, 2019 and U.S. Provisional Patent Application, Ser. No. 62/813,810, filed on Mar. 5, 2019. The U.S. Provisional Patent Applications are hereby incorporated by reference in their entireties.

FIELD OF THE INVENTION

The present invention relates to prediction for video coding using ISP (Intra Sub-Partition) mode. In particular, the present invention discloses transform type selection for the ISP mode in order to improve the coding performance or to simplify the coding process.

BACKGROUND AND RELATED ART

High-Efficiency Video Coding (HEVC) is a new international video coding standard developed by the Joint Collaborative Team on Video Coding (JCT-VC). HEVC is based on the hybrid block-based motion-compensated DCT-like transform coding architecture. The basic unit for compression, termed coding unit (CU), is a 2N×2N square block, and each CU can be recursively split into four smaller CUs until the predefined minimum size is reached. Each CU contains one or multiple prediction units (PUs).

To achieve the best coding efficiency of hybrid coding architecture in HEVC, there are two kinds of prediction modes (i.e., Intra prediction and Inter prediction) for each PU. For Intra prediction modes, the spatial neighboring reconstructed pixels can be used to generate the directional predictions. There are up to 35 directions in HEVC. For Inter prediction modes, the temporal reconstructed reference frames can be used to generate motion compensated predictions. There are three different modes, including Skip, Merge and Inter Advanced Motion Vector Prediction (AMVP) modes.

When a PU is coded in Inter AMVP mode, motion-compensated prediction is performed with transmitted motion vector differences (MVDs) that can be used together with Motion Vector Predictors (MVPs) for deriving motion vectors (MVs). To decide MVP in Inter AMVP mode, the advanced motion vector prediction (AMVP) scheme is used to select a motion vector predictor among an AMVP candidate set including two spatial MVPs and one temporal MVP. So, in AMVP mode, MVP index for MVP and the corresponding MVDs are required to be encoded and transmitted. In addition, the Inter prediction direction to specify the prediction directions among bi-prediction, and uni-prediction which are list 0 (i.e., L0) and list 1 (i.e., L1), accompanied with the reference frame index for each list should also be encoded and transmitted.

When a PU is coded in either Skip or Merge mode, no motion information is transmitted except for the Merge index of the selected candidate since the Skip and Merge modes utilize motion inference methods. Since the motion vector difference (MVD) is zero for the Skip and Merge modes, the MV for the Skip or Merge coded block is the same as the motion vector predictor (MVP) (i.e., MV=MVP+MVD=MVP). Accordingly, the Skip or Merge coded block obtains the motion information from spatially neighboring blocks (spatial candidates) or a temporal block (temporal candidate) located in a co-located picture. The co-located picture is the first reference picture in list 0 or list 1, which is signaled in the slice header. In the case of a Skip PU, the residual signal is also omitted. To decide the Merge index for the Skip and Merge modes, the Merge scheme is used to select a motion vector predictor among a Merge candidate set containing four spatial MVPs and one temporal MVP.

FIG. 1 shows the neighboring PUs used to derive the spatial and temporal MVPs for both AMVP and Merge scheme. In AMVP, the left MVP is the first available one from $A_0$, $A_1$, the top MVP is the first available one from $B_0$, $B_1$, $B_2$, and the temporal MVP is the first available one from $T_{BR}$ or $T_{CTR}$ ($T_{BR}$ is used first, if $T_{BR}$ is not available, $T_{CTR}$ is used instead). If the left MVP is not available and the top MVP is not scaled MVP, the second top MVP can be derived if there is a scaled MVP among $B_0$, $B_1$, and $B_2$. The list size of MVPs of AMVP is 2 in HEVC. Therefore, after the derivation process of the two spatial MVPs and one temporal MVP, only the first two MVPs can be included in the MVP list. If after removing redundancy, the number of available MVPs is less than two, zero vector candidates are added to the candidates list.

For Skip and Merge mode, as shown in FIG. 1, up to four spatial Merge index are derived from $A_0$, $A_1$, $B_0$ and $B_1$, and one temporal Merge index is derived from $T_{BR}$ or $T_{CTR}$ ($T_{BR}$ is used first, if $T_{BR}$ is not available, $T_{CTR}$ is used instead). Note that if any of the four spatial Merge index is not available, the position $B_2$ is then used to derive Merge index as a replacement. After the derivation process of the four spatial Merge index and one temporal Merge index, removing redundancy is applied to remove redundant Merge index. If after removing redundancy, the number of available Merge index is smaller than five, three types of additional candidates are derived and are added to the candidates list.

Additional bi-predictive Merge candidates are created by using original Merge candidates. The additional candidates are divided into three candidate types:

1. Combined bi-predictive Merge candidate (candidate type 1)
2. Scaled bi-predictive Merge candidate (candidate type 2)
3. Zero vector Merge/AMVP candidate (candidate type 3)

In candidate type 1, combined bi-predictive Merge candidates are created by combining original Merge candidate. In particular, two candidates in original candidates, which have mvL0 (the motion vector in list 0) and refIdxL0 (the reference picture index in list 0) or mvL1 (the motion vector in list 1) and refIdxL1 (the reference picture index in list 1), are used to created bi-predictive Merge candidates. FIG. 2 illustrates an example of the derivation process for combined bi-predictive Merge candidate. The candidate set 210 corresponds to an original candidate list, which includes mvL0_A, ref0 (231) in L0 and mvL1_B, ref (232) in L1. A bi-prediction MVP 233 can be formed by combining the candidates in L0 and L1.

In candidate type 2, scaled bi-predictive Merge candidates are created by scaling original Merge candidate. In particular, one candidate in original candidates, which have mvLX (the motion vector in list X) and refIdxLX (the reference picture index in list X), X can be 0 or 1, is used to created bi-predictive Merge candidates. For example, one candidate A is list 0 uni-predictive with mvL0_A and ref0, ref0 is firstly copied to reference index ref0' in list 1. After that, mvL0'_A is calculated by scaling mvL0_A with ref0 and ref0'. Then, bi-predictive Merge candidate which has mvL0_A and ref0 in list 0 and mvL0'_A and ref0' in list 1, is created and added into Merge candidate list. An example of the derivation process of the scaled bi-predictive Merge candidate is shown in FIG. 3, where candidate list 310 corresponds to an original candidate list and candidate list 320 corresponds to the expanded candidate list including two generated bi-prediction MVPs.

In candidate type 3, Zero vector Merge/AMVP candidates are created by combining zero vectors and reference index, which can be referred. FIG. 4A illustrates an example for adding zero vector Merge candidates, where candidate list 410 corresponds to an original Merge candidate list and candidate list 420 corresponds to the extended Merge candidate list by adding zero candidates. FIG. 4B illustrates an example for adding zero vector AMVP candidates, where candidate lists 430 (L0) and 432 (L1) correspond to original AMVP candidate lists and the candidate list 440 (L0) and 442 (L1) correspond to the extended AMVP candidate lists by adding zero candidates. If zero vector candidates are not duplicated, it is added to Merge/AMVP candidates list.

When a PU is coded in Intra mode, the Intra prediction method only exploits one reference tier (or line) adjacent to the current prediction unit (PU) and one of the Intra prediction modes to generate the predictors for the current PU. The reference tier adjacent to the current prediction unit (PU) means the reference L-shape reconstructed samples, which are used for Intra prediction. For Intra prediction modes, the spatial neighboring reconstructed pixels can be used to generate the directional prediction. There are up to 35 directions in HEVC. Out of all 35 Intra prediction modes in HEVC, 3 modes are considered as most probable modes (MPM) for predicting the Intra prediction mode in the current prediction block. Three modes selected as the MPM set. For example, the MPM set comprises the Intra prediction modes used in the left prediction block and in the above prediction block. In case that the Intra prediction modes in two neighboring blocks are identical and both directional, or only one of the two neighboring blocks is available and coded in Intra prediction and at the same time this Intra prediction mode is directional, two neighboring directions immediately next to this direction is also used in MPM. DC mode and Planar mode are also considered in MPM set to fill the available spot in the MPM, especially if the above or top neighboring blocks are not available or not coded in Intra prediction, or the Intra prediction modes in neighboring blocks are not directional. If the Intra prediction mode for current prediction block is one of the modes in the MPM set, 1 or 2 bins is used to signal which one it is. Otherwise, it is not the same as any entry in the MPM set, it will be coded as a non-MPM mode. There are all-together 32 such non-MPM modes and a (5-bit) fixed length coding method is applied to signal this mode. The 33 directions are illustrated in FIG. 5. In FIG. 5, there are all together 33 directional modes, so H, H+1~H+8, H−1~H−7, V, V+1~V+8, V−1~V−8 are used. This system can be expanded to a general case, where horizontal and vertical modes are represented as H and V modes. For other directional modes, they can be represented either as H+k or V+k modes, where k=±1, ±2, etc. For example, if 65 directional modes are used, k can be range from ±1 to ±16.

As for signaling, in the Joint Exploration Test Model (JEM) (J. Chen, et al., "*Algorithm Description of Joint Exploration Test Model 7 (JEM 7)*", ITU-T SG 16 WP 3 and ISO/IEC JTC 1/SC 29/WG 11, 7th Meeting: Torino, Italy, July 2017, Document: JVET-G1001), the following method is used to encode the Intra prediction mode for the luma component.

Coding of MPM Modes: Generate a list of 6 Most Probable Modes (MPM) from the neighboring modes. Use truncated unary coding if the prediction mode is one of the modes in MPM list.

Coding of Non-MPM Modes: If the best prediction mode does not belong to the MPM list, either a fixed length code or truncated binarization method is used.

MPM List Generation in JEM Test Model

In the JEM, the modes included into the MPM lists are classified into three groups:

Intra modes of neighboring blocks (i.e., neighboring Intra modes)

Derived Intra modes

Default Intra modes

Five neighboring Intra prediction modes are used to form the MPM list. The locations of 5 neighboring modes, i.e., left (L), above (A), below-left (BL), above-right (AR), and above-left (AL) are shown in FIG. 6. An initial MPM list is formed by inserting 5 neighboring Intra modes, planar mode and DC modes into the MPM list. A pruning process is used to remove duplicated modes so that only unique modes can be included in the MPM list. The order in which the initial modes are included is: left, above, planar, DC, below-left, above-right, and then above-left.

If the MPM list is not full (i.e., less than 6 MPM candidates in the list), derived modes are added. The derived modes are obtained by adding −1 or +1 to the angular modes that are already included in the MPM list. Such additional derived modes are not generated from the non-angular modes (i.e., DC or planar mode).

Finally, if the MPM list is still not full, the default modes are added to the list in the following order: vertical, horizontal, mode 2, and a diagonal mode. As a result of this process, a unique list of 6 MPM modes is generated.

The coding for selection of the remaining 61 non-MPMs is done as follows. The 61 non-MPMs are first divided into two sets: a selected modes set and a non-selected modes set. The selected modes set contains 16 modes and the rest modes (i.e., 45 modes) are assigned to the non-selected modes set. The mode set that the current mode belongs to is indicated in the bitstream with a flag. If the mode to be indicated is within the selected modes set, the selected mode is signaled with a 4-bit fixed-length code. If the mode to be indicated is from the non-selected set, the selected mode is signaled with a truncated binary code. The selected modes set is generated by sub-sampling the 61 non-MPM modes as follows:

Selected modes set={0,4,8,12,16,20 . . . 60}, and

Non-selected modes set={1,2,3,5,6,7,9,10 . . . 59}.

In order to improve transform, in JCTVC-B024 (C. Yeo, et al., "*Mode-Dependent Fast Separable KLT for Block-based Intra Coding*", Joint Collaborative Team on Video Coding (JCT-VC) of ITU-T SG16 WP3 and ISO/IEC JTC1/SC29/WG11, 2nd Meeting: Geneva, CH, 21-28 Jul. 2010, Document: JCTVC-B024), JCTVC-C108 (A. Saxena, et al., "*Jointly optimal intra prediction and adaptive primary transform*", Joint Collaborative Team on Video Coding (JCT-VC) of ITU-T SG16 WP3 and ISO/IEC JTC1/SC29/WG11, 3rd Meeting: Guangzhou, CN, 7-15 Oct. 2010, Document: JCTVC-C108), JCTVC-E125 (A. Saxena, et al., "*CE7: Mode-dependent DCT/DST without 4\*4 full matrix multiplication for intra prediction*", Joint Collaborative Team on Video Coding (JCT-VC) of ITU-T SG16 WP3 and ISO/IEC JTC1/SC29/WG11, 5th Meeting: Geneva, CH, 16-23 Mar. 2011, Document: JCTVC-E125), Discrete Sine Transform (DST) was introduced to be used alternatively with DCT for oblique Intra modes. For Inter-predicted residue, DCT-II is the only transform used in current HEVC.

However, the DCT-II is not the optimal transform for all cases. In JCTVC-G281 (J. An, et al, "*Non-CE7: Boundary-Dependent Transform for Inter-Predicted Residue*", Joint Collaborative Team on Video Coding (JCT-VC) of ITU-T SG16 WP3 and ISO/IEC JTC1/SC29/WG11, 7th Meeting: Geneva, CH., 21-30, Nov., 2011, Document: JCTVC-G281), the Discrete Sine Transform type VII (DST-VII) and Discrete Cosine Transform type IV (DCT-IV) are proposed to replace DCT-II in some cases. Also in JVET-D1001 (J. Chen, et al., "*Algorithm Description of Joint Exploration Test Model 4*", Joint Video Exploration Team (JVET) of ITU-T SG16 WP3 and ISO/IEC JTC1/SC29/WG11, 4th Meeting: Chengdu, CN, 15-21 Oct. 2016, Document: JVET-D1001), an Adaptive Multiple Transform (AMT) scheme is used for residual coding for both Intra and Inter coded blocks. It utilizes multiple selected transforms from the DCT/DST families other than the current transforms in HEVC. The newly introduced transform matrices are DST-VII, DCT-VIII, DST-I and DCT-V. For Intra residue coding, due to the different residual statistics of different Intra prediction modes, a mode-dependent transform candidate selection process is used. Three transform subsets have been defined as shown in Table 1, and the transform subset is selected based on the Intra prediction mode, as specified in Table 2.

TABLE 1

Three pre-defined transform candidate sets

| Transform Set | Transform Candidates |
|---|---|
| 0 | DST-VII, DCT-VIII |
| 1 | DST-VII, DST-I |
| 2 | DST-VII, DCT-VIII |

Intra Sub-Partition (ISP) Mode

In JVET-M0102 (S. De-Luxán-Hernández, et al., "*CE3: Intra Sub-Partitions Coding Mode (Tests 1.1.1 and 1.1.2)*", ITU-T SG 16 WP 3 and ISO/IEC JTC 1/SC 29/WG 11, 13th Meeting: Marrakech, Mass., January 2019, Document: JVET-M0102), the Intra Sub-Partitions (ISP) coding mode is an updated version of the Line-Based Intra (LIP) coding that corrects the hardware-related issues of the previous design of the algorithm. The ISP tool divides luma intra-predicted blocks vertically or horizontally into 2 or 4 sub-partitions depending on the block size dimensions, as shown in Table 3. FIG. 7A and FIG. 7B show examples of the two possibilities. In FIG. 7A, an H×W block 710 is partitioned into two H/2×W blocks 720 (i.e., horizontal partition) or two H×W/2 blocks 730 (i.e., vertical partition). For example, the block can be a 4×8 block or an 8×4 block. In FIG. 7B, an H×W block 710 is partitioned into four H/4×W blocks 740 (i.e., horizontal partition) or four H×W/4 blocks 750 (i.e., vertical partition) except for 4×8, 8×4 and 4×4 blocks. All sub-partitions fulfil the condition of having at least 16 samples.

TABLE 3

Number of sub-partitions depending on the block size

| Block Size | Number of Sub-Partitions |
|---|---|
| 4 × 4 | Not divided |
| 4 × 8 and 8 × 4 | 2 |
| All other cases | 4 |

For each of these sub-partitions, a residual signal is generated by entropy decoding the coefficients sent by the encoder and then inverse quantizing and inverse transforming them. Then, the sub-partition is Intra predicted and finally the corresponding reconstructed samples are obtained by adding the residual signal to the prediction signal. Therefore, the reconstructed values of each sub-partition will be available to generate the prediction of the next one, which will repeat the process and so on. All sub-partitions share the same Intra mode Based on the Intra mode and the split utilized, two different classes of processing orders are used, which are referred to as normal and reversed order. In the normal order, the first sub-partition to be processed is the one containing

TABLE 2

Selected (H)orizontal and (V)ertical transform sets for each Intra prediction mode

| Intra Mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| V | 2 | 1 | 0 | 1 | 0 | 1 | 0 | 1 | 0 | 1 | 0 | 1 | 0 | 1 | 0 | 0 | 0 | 0 |
| H | 2 | 1 | 0 | 1 | 0 | 1 | 0 | 1 | 0 | 1 | 0 | 1 | 0 | 1 | 2 | 2 | 2 | 2 |

| Intra Mode | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| V | 0 | 0 | 0 | 0 | 0 | 1 | 0 | 1 | 0 | 1 | 0 | 1 | 0 | 1 | 0 | 1 | 0 |
| H | 2 | 2 | 2 | 2 | 2 | 1 | 0 | 1 | 0 | 1 | 0 | 1 | 0 | 1 | 0 | 1 | 0 |

| Intra Mode | 35 | 36 | 37 | 38 | 39 | 40 | 41 | 42 | 43 | 44 | 45 | 46 | 47 | 48 | 49 | 50 | 51 | 52 |
|---|---|---|---|---|---|---|---|---|---|---|---|---|---|---|---|---|---|---|
| V | 1 | 0 | 1 | 0 | 1 | 0 | 1 | 0 | 1 | 0 | 1 | 2 | 2 | 2 | 2 | 2 | 2 | 2 |
| H | 1 | 0 | 1 | 0 | 1 | 0 | 1 | 0 | 1 | 0 | 1 | 0 | 0 | 0 | 0 | 0 | 0 | 0 |

| Intra Mode | 53 | 54 | 55 | 56 | 57 | 58 | 59 | 60 | 61 | 62 | 63 | 64 | 65 | 66 |
|---|---|---|---|---|---|---|---|---|---|---|---|---|---|---|
| V | 2 | 2 | 1 | 0 | 1 | 0 | 1 | 0 | 1 | 0 | 1 | 0 | 1 | 0 |
| H | 0 | 0 | 1 | 0 | 1 | 0 | 1 | 0 | 1 | 0 | 1 | 0 | 1 | 0 | the top-left sample of the CU and then continuing downwards (horizontal split) or rightwards (vertical split). As a result, reference samples used to generate the sub-partitions prediction signals are only located at the left and above sides of the lines. On the other hand, the reverse processing order either starts with the sub-partition containing the bottom-left sample of the CU and continues upwards or starts with sub-partition containing the top-right sample of the CU and continues leftwards.

A more detailed explanation of the algorithm can be found in In JVET-M0102.

In developing VVC software, transformation process for scaled transform coefficients can be described as follows.

Inputs to this process are:

a luma location (xTbY, yTbY) specifying the top-left sample of the current luma transform block relative to the top-left luma sample of the current picture, a variable nTbW specifying the width of the current transform block, a variable nTbH specifying the height of the current transform block, a variable cIdx specifying the colour component of the current block, an (nTbW)×(nTbH) array d[x][y] of scaled transform coefficients with x=0 . . . nTbW−1, y=0 . . . nTbH−1.

Output of this process is the (nTbW)×(nTbH) array r[x][y] of residual samples with x=0 . . . nTbW−1, y=0 . . . nTbH−1.

The variable implicitMtsEnabled is derived as follows: (When multiple transform selection, denoted as MTS, is enabled, implicitMtsEnabled equal to 0 means the transform type is decided with a signalled transform index and implicitMtsEnabled equal to 1 means the transform type is decided with an implicit transform settings such as type settings, block settings, mode settings, or any combination of the above settings). ImplicitMtsEnabled is set to 1 in some cases. The following is an example.

If sps_mts_enabled_flag is equal to 1 (which means multiple transform selection is enabled) and one of the following conditions is true, implicitMtsEnabled is set equal to 1:

IntraSubPartitionsSplitType is not equal to ISP_NO_SPLIT (which means ISP mode is used)

cu_sbt_flag is equal to 1 and Max(nTbW, nTbH) is less than or equal to 32 sps_explicit_mts_intra_enabled_flag and sps_explicit_mts_inter_enabled_flag are both equal to 0 and CuPredMode[xTbY][yTbY] is equal to MODE_INTRA and low frequency non-separable transform (LFNST) and matrixed-based intra prediction (MIP) are not used.

Otherwise, implicitMtsEnabled is set equal to 0.

The conditions for implicitMtsEnable can be any subset of the above conditions.

The variable trTypeHor specifying the horizontal transform kernel and the variable trTypeVer specifying the vertical transform kernel are derived as follows:

The value of trTypeHor or trTypeVer equal to 0 refers to the default transform type, for example, DCT-II. The value of trTypeHor or trTypeVer larger than 0 means the transform type selected from MTS. For example, the value of trTypeHor or trTypeVer equal to 1 refers to DST-VII and the value of trTypeHor or trTypeVer equal to 2 refers to DCT-VIII.

If cIdx is greater than 0 (current TB is a chroma TB), trTypeHor and trTypeVer are set equal to 0.

If IntraSubPartitionsSplitType is not equal to ISP_NO_SPLIT and lfnst_idx is not equal to 0, trTypeHor and trTypeVer are set equal to 0.

Otherwise, if implicitMtsEnabled is equal to 1, different methods can be used to decide trTypeHor or trTypeVer.

The following is an example.

If IntraSubPartitionsSplitType is not equal to ISP_NO_SPLIT, trTypeHor and trTypeVer are specified in Table 6 depending on intraPredMode.

Otherwise, if cu_sbt_flag is equal to 1, trTypeHor and trTypeVer are specified in Table 5 depending on cu_sbt_horizontal_flag and cu_sbt_pos_flag.

Otherwise, (sps_explicit_mts_intra_enabled_flag and sps_explicit_mts_inter_enabled_flag are equal to 0), trTypeHor and trTypeVer are derived as follows:

$$trTypeHor=(nTbW>=4\ \&\&\ nTbW<=16\ \&\&\ nTbW<=nTbH)?1:0 \quad (1)$$

$$trTypeVer=(nTbH>=4\ \&\&\ nTbH<=16\ \&\&\ nTbH<=nTbW)?1:0 \quad (2)$$

Otherwise, trTypeHor and trTypeVer are specified in Table 4 depending on tu_mts_idx[xTbY][yTbY].

TABLE 4

Specification of trTypeHor and trTypeVer depending on tu_mts_idx[ x ][ y ]

| | tu_mts_idx[ x0 ][ y0 ] | | | | |
|---|---|---|---|---|---|
| | 0 | 1 | 2 | 3 | 4 |
| trTypeHor | 0 | 1 | 2 | 1 | 2 |
| trTypeVer | 0 | 1 | 1 | 2 | 2 |

TABLE 5

Specification of trTypeHor and trTypeVer depending on cu_sbt_horizontal_flag and cu_sbt_pos_flag

| cu_sbt_horizontal_flag | cu_sbt_pos_flag | trTypeHor | trTypeVer |
|---|---|---|---|
| 0 | 0 | 2 | 1 |
| 0 | 1 | 1 | 1 |
| 1 | 0 | 1 | 2 |
| 1 | 1 | 1 | 1 |

TABLE 6

Specification of trTypeHor and trTypeVer depending on predModeIntra

| predModeIntra | trTypeHor | trTypeVer |
|---|---|---|
| INTRA_PLANAR, INTRA_ANGULAR31, INTRA_ANGULAR32, INTRA_ANGULAR34, INTRA_ANGULAR36, INTRA_ANGULAR37 | ( nTbW >= 4 && nTbW <= 16 ) ? 1 : 0 | ( nTbH >= 4 && nTbH <= 16 ) ? 1 : 0 |
| INTRA_ANGULAR33, INTRA_ANGULAR35 | 0 | 0 |
| INTRA_ANGULAR2, INTRA_ANGULAR4, . . . , INTRA_ANGULAR28, INTRA_ANGULAR30, INTRA_ANGULAR39, INTRA_ANGULAR41, . . . , INTRA_ANGULAR63, INTRA_ANGULAR65 | ( nTbW >= 4 && nTbW <= 16 ) ? 1 : 0 | 0 |
| INTRA_ANGULAR3, INTRA_ANGULAR5, . . . , INTRA_ANGULAR27, INTRA_ANGULAR29, INTRA_ANGULAR38, INTRA_ANGULAR40, . . . , INTRA_ANGULAR64, INTRA_ANGULAR66 | 0 | ( nTbH >= 4 && nTbH <= 16 ) ? 1 : 0 |

When new coding tools are developed and used with transform, multiple transform types such as DCT-II, DST-VII, or DST-VIII can be selected to improve the coding efficiency. Instead of setting DCT-II as the default transform mode, which is indicated with the shortest codewords compared to other transform mode, for both horizontal and vertical transform, some criteria can be used to choose the default transform types of horizontal transform and vertical transform for Inter or Intra blocks.

In VTM, when a CU is coded in Merge mode, and if the CU contains at least 64 luma samples (i.e., CU width times CU height equal to or larger than 64), an additional flag is signaled to indicate if the combined Inter/Intra prediction (CIIP) mode is applied to the current CU. In order to form the CIIP prediction, an Intra prediction mode is first derived from two additional syntax elements. Up to four possible Intra prediction modes can be used: DC, planar, horizontal, or vertical. Then, the Inter prediction and Intra prediction signals are derived using regular Intra and Inter decoding processes. Finally, weighted averaging of the Inter and Intra prediction signals is performed to obtain the CIIP prediction. A more detailed explanation of the algorithm can be found in JVET-L0100 (M.-S. Chiang, et al., "CE10.1.1: Multi-hypothesis prediction for improving AMVP mode, skip or merge mode, and Intra mode," ITU-T SG 16 WP 3 and ISO/IEC JTC 1/SC 29/WG 11, 12th Meeting: Macao, Conn., October 2018, Document: JVET-L0100).

BRIEF SUMMARY OF THE INVENTION

A method and apparatus of prediction for video coding are disclosed. According to this method, input data related to a current block in a current picture is received at a video encoder side or a video bitstream corresponding to compressed data including the current block in the current picture is received at a video decoder side. If Intra Sub-Partition (ISP) mode is used for the current block, the following steps are performed: partitioning the current block into multiple sub-blocks horizontally or vertically; determining a target horizontal transform and a target vertical transform from a candidate transform set for each of the multiple sub-blocks according to a setting group comprising a unified setting or a block setting, wherein the unified setting is applicable to a particular coding mode, a normal Intra mode and other Intra-related modes, and the block setting corresponds to block width, block height, block ratio, block area or any combination thereof of the current block; and applying the target horizontal transform and the target vertical transform to each of the multiple sub-blocks.

Another method and apparatus of transform for video coding are also disclosed. According to this method, a target horizontal transform and a target vertical transform are determined from a candidate transform set without a transform index for the current block according to unified setting, where the unified setting comprises two or more Intra modes or Intra-related modes. The target horizontal transform and the target vertical transform are then applied to the current block.

In one embodiment, the target horizontal transform and the target vertical transform belong to a subset comprising any combination of DCT-II, DST-VII, DCT-VIII, and flipped DST-VII. For example, a pair representing (the target horizontal transform, the target vertical transform) corresponds to (DCT-II, DCT-II), (DST-VII, DCT-II), (DCT-II, DST-VII), or (DST-VII, DST-VII).

In one embodiment, the target horizontal transform and the target vertical transform are determined based on the block width, the block height, the block ratio, the block area or any combination thereof of the current block. For example, the target horizontal transform is changed from DCT-II to another transform type when the block width is smaller than or equal to the block height. In another example, the target horizontal transform is changed from DCT-II to DST-VII when the block width is within [4, 16], the block width is smaller than or equal to the block height, or both the block width is within [4, 16] and the block width is smaller than or equal to the block height. In yet another example, the target vertical transform is changed from DCT-II to DST-VII when the block height is within [4, 16], the block height is smaller than or equal to the block width, or both the block height is within [4, 16] and the block height is smaller than or equal to the block width.

In one embodiment, the unified setting comprises a normal Intra mode. The candidate transform set may be the same as a normal transform set for the normal Intra mode. A shortest codeword for candidate transforms in the candidate transform set may be set to DST-VII for both the target horizontal transform and the target vertical transform. In another embodiment, the ISP mode uses a same Intra prediction mode list as the normal Intra mode. In another embodiment, the ISP mode uses a subset of the Intra prediction mode list as the normal Intra mode. In yet another embodiment, the ISP mode is disabled according to the block width, the block height, or the block area.

In one embodiment, the target setting is determined implicitly. In another embodiment, a decision for the target setting is signaled at CU (coding unit), CTU (coding tree unit), slice, tile, tile group, SPS (sequence parameter set), or PPS (picture parameter set) level.

In one embodiment, the setting group further comprises mode setting and the mode setting corresponds to a selected Intra mode for the current block. For example, the selected Intra mode corresponds to a directional mode satisfying (directional modes % 2==1). In another example, the selected Intra mode corresponds to a directional mode satisfying (directional modes % 2==0).

DETAILED DESCRIPTION OF THE INVENTION

Figure 1:
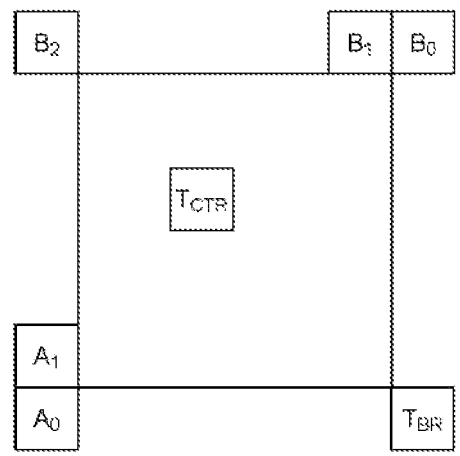
FIG. 1 shows the neighboring PUs used to derive the spatial and temporal MVPs for both AMVP and Merge scheme.
Figure 2:
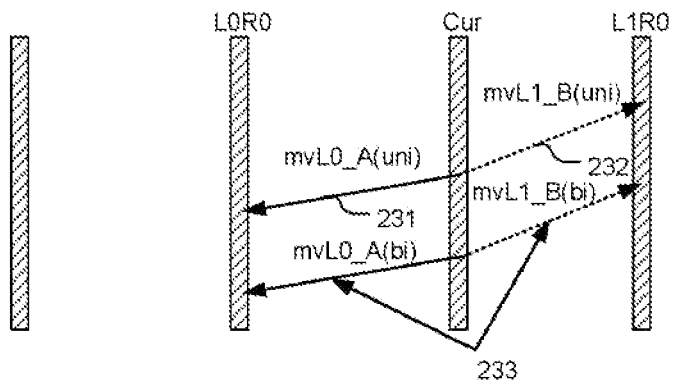
FIG. 2 illustrates an example of the derivation process for combined bi-predictive Merge candidate.
Figures 3, 4A:
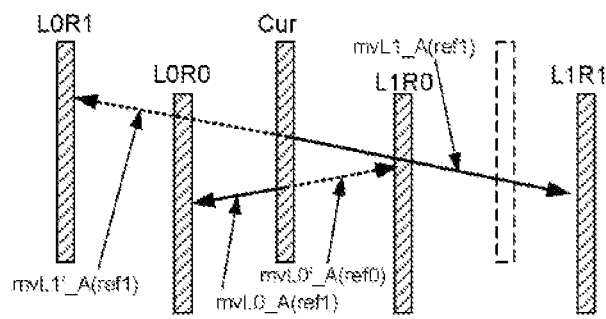
FIG. 3 illustrates an example of the derivation process of the scaled bi-predictive Merge candidate, where candidate list on the left corresponds to an original candidate list and the candidate list on the right corresponds to the expanded candidate list including two generated bi-prediction MVPs.
FIG. 4A illustrates an example of adding zero vector Merge candidates, where the candidate list on the left corresponds to an original Merge candidate list and the candidate list on the right corresponds to the extended Merge candidate list by adding zero candidates.
Figure 4B:
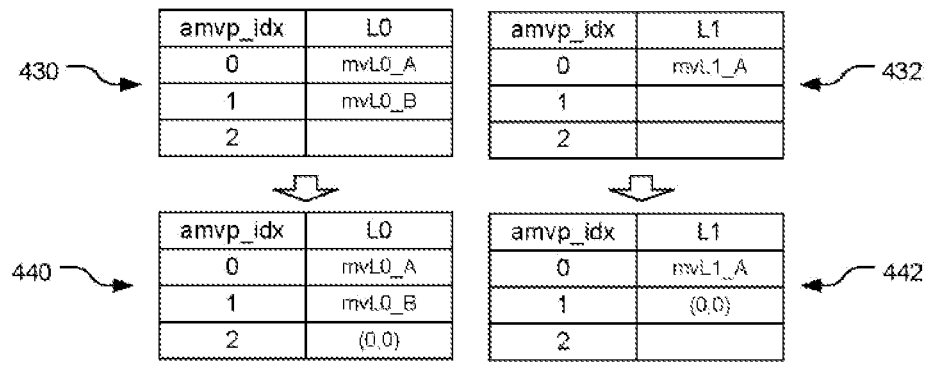
FIG. 4B illustrates an example for adding zero vector AMVP candidates, where the candidate lists on the top correspond to original AMVP candidate lists (L0 on the left and L1 on the right) and the candidate lists at the bottom correspond to the extended AMVP candidate lists (L0 on the left and L1 on the right) by adding zero candidates.
Figure 5:
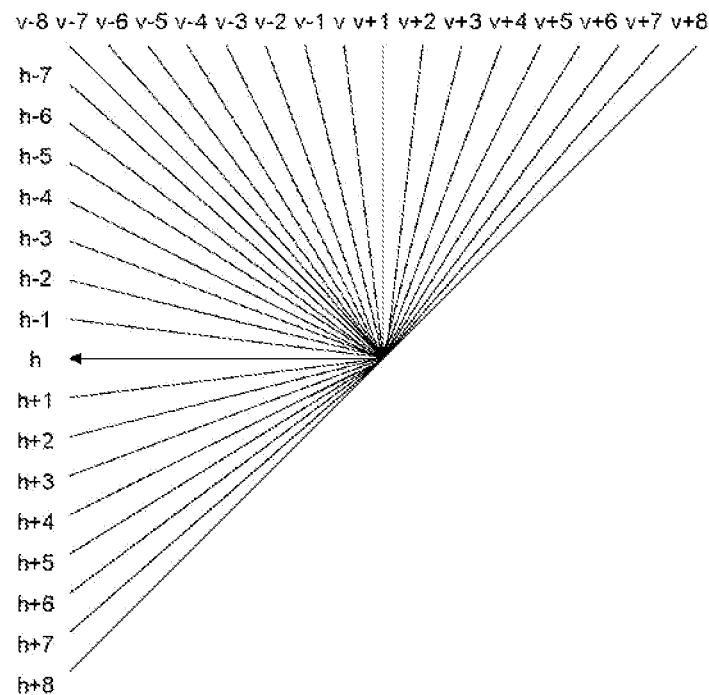
FIG. 5 illustrates the 33 directional Intra prediction mode as used by the HEVC (high efficiency video coding) standard.
Figure 6:
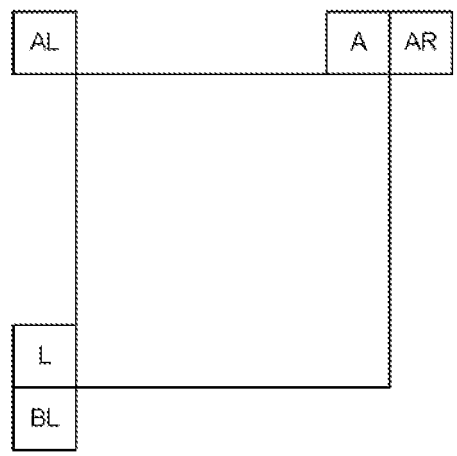
FIG. 6 illustrates an example of deriving the MPM (Most Probable Modes) list based on five neighboring Intra prediction modes, where the locations of 5 neighboring modes include left (L), above (A), below-left (BL), above-right (AR), and above-left (AL).
Figure 7A:
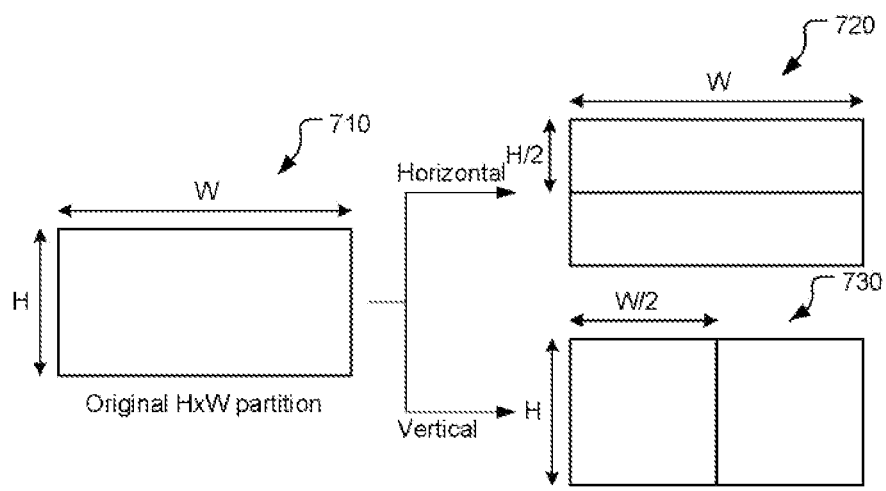
FIG. 7A illustrates an example of ISP (Intra Sub-Partition), where an H×W block is partitioned into two H/2×W blocks (i.e., horizontal partition) or two H×W/2 blocks (i.e., vertical partition).
Figure 7B:
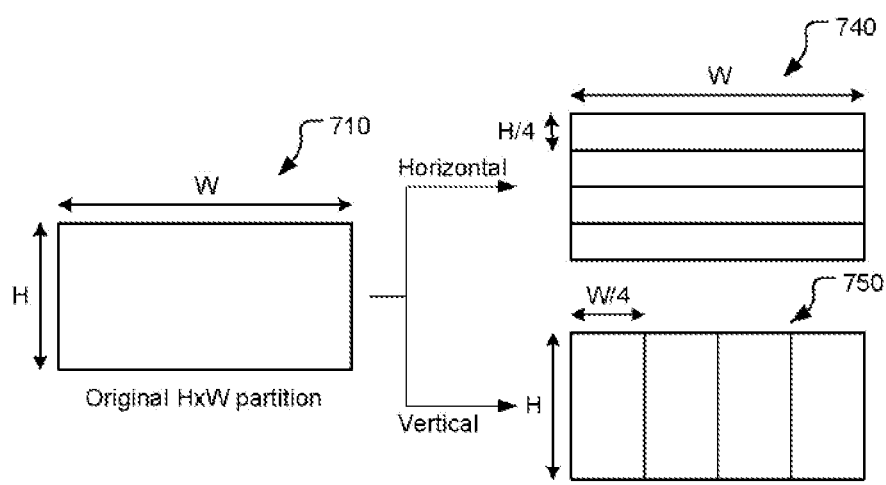
FIG. 7B illustrates an example of ISP (Intra Sub-Partition), where an H×W block is partitioned into four H/4×W blocks (i.e., horizontal partition) or four H×W/4 blocks (i.e., vertical partition) except for 4×8, 8×4 and 4×4 blocks.

The following description is of the best-contemplated mode of carrying out the invention. This description is made for the purpose of illustrating the general principles of the invention and should not be taken in a limiting sense. The scope of the invention is best determined by reference to the appended claims.

Different methods of improving or simplifying Intra modes containing normal Intra mode and ISP, Intra-related modes containing CIIP, or triangular prediction unit mode (TPM) are disclosed in the present invention.

Normal Intra mode means the Intra prediction of the current block is generated by using DC, planar, or one of directional modes consisting of 33 or 65 directions and referencing the reconstructed samples from the neighboring blocks adjacent or non-adjacent to the current block.

ISP is to apply Intra prediction on a sub-partition by sub-partition basis. The sub-partition is Intra predicted and finally, the corresponding reconstructed samples are calculated by adding the residual signal to the prediction signal. In one embodiment, the candidate transform set for ISP mode is the same as that for the normal Intra mode. In another embodiment, the first candidate transform, which can be represented with the shortest codeword among the candidate transform set, is different from that for the normal Intra mode. In another embodiment, the first candidate transform, which can be represented with the shortest codeword among the candidate transform set, is set to DST-VII for both vertical and horizontal transform types. In another embodiment, when ISP is applied, the Intra prediction mode list is the same as that for the normal Intra mode. In another embodiment, the Intra prediction mode list is a subset of that for the normal Intra mode according to a predefined rule. For example, the predefined rule is to remove DC or planar mode from the Intra prediction mode list. In another example, the predefined rule is to reduce the number of Intra prediction modes according to the block width, block height or block area.

In another embodiment, ISP mode can be disabled or constrained according to the block width, block height or block area. When ISP is disabled, the signaling for ISP is not required and can be bypassed. When ISP is constrained, the combinations of ISP mode are reduced and the coding bins for signaling ISP mode can also be reduced. For example, when the block area is larger than or small than a threshold (e.g., 64, 128, 256, 512, 1024, 2048, or the square of minimum/maximum transform block size specified in the standard), ISP mode is disabled or constrained. In another example, when the block width or height is larger than or smaller than a threshold (e.g., 64, 128, 256, 512, 1024, or the minimum/maximum transform block size specified in the standard), ISP mode is disabled. In another example, when the block width or height is larger than or smaller than a threshold (e.g., 64, 128, 256, 512, 1024, or the minimum/maximum transform block size specified in the standard), ISP mode with vertical or horizontal partition is disabled. In another example, when the long side of the block is larger than the short side of the block multiplied by a threshold (e.g., 64, 128, 256, 512, or 1024), ISP mode is disabled. In another example, when the long side of the block is larger than the short side of the block multiplied by a threshold (e.g., 64, 128, 256, 512, or 1024), ISP mode with vertical or horizontal partition is disabled.

In the developing of an emerging new coding standard, named as VVC (Versatile Video Coding), different settings are applied to decide the transform modes for a particular block aspect ratio or for some new tools such as ISP. In the present invention, a more powerful rule for improving coding efficiency is disclosed. Also, an extended rule is disclosed by extending an existing rule to general cases for simplification of choosing the default transform types for horizontal transform and vertical transform. The rule can depend on type settings, mode settings, block settings, unified settings, or any combination of above. The meaning of these setting will be described in details later. Without this rule, the default transform types for horizontal transform and vertical transform are assigned with DCT-II.

The purpose of this rule is to allow more transform types for increasing the diversity when applying the default transform mode. It can help to speed up the encoder processing. For example, in some fast algorithms, the RD (Rate-Distortion) cost with the default transform mode applied can be used to early terminate following mode decision for multiple transform modes. When the cost with the default transform mode applied is improved, some of other transform modes do not need to be tried anymore. In one embodiment, in addition to DCT-II, the transform types used in this rule are already supported or can be easily derived from the kernels of existing transform types. Therefore, there is no extra buffer requirement for storing the coefficients of the transform mode used in this rule.

Type settings mean that the transform types used in this rule. In one embodiment, the default transform types can be chosen from any subset of {DCT-II, DST-VII, DCT-VIII, flipped DST-VII} and the transform types for horizontal transform and vertical transform can be any combination within the selected subset. For example, the combination, denoted as (hor, ver), can be (DCT-II, DCT-II), (DST-VII, DCT-II), (DCT-II, DST-VII), or (DST-VII, DST-VII). In another embodiment, type settings are used when the target horizontal or target vertical transform is selected without a transform index.

Block settings mean that this rule decides the transform types for the default transform depending on the block width, block height, block ratio, or block area. In one embodiment, if the block width is smaller than or equal to the block height, the transform type of the horizontal transform is changed to other transform type, such as DST-VII, DCT-VIII, or flipped DST-VII; otherwise, the transform type of the horizontal transform is set to DCT-II. In another embodiment, if the block height is smaller than or equal to the block width, the transform type of the vertical transform is changed to other transform type, such as DST-VII, DCT-VIII, or flipped DST-VII; otherwise, the transform type of the vertical transform is set to DCT-II. In another embodiment, block settings are used when the target horizontal or target vertical transform is selected without a transform index.

In another embodiment, if the length of the block width is within a predefined interval, the transform type of the horizontal transform is changed to other transform type such as DST-VII, DCT-VIII, or flipped DST-VII; otherwise, the transform type of the horizontal transform is set to DCT-II. In another embodiment, if the length of the block height is within a predefined interval, the transform type of the vertical transform is changed to other transform type, such as DST-VII, DCT-VIII, or flipped DST-VII; otherwise, the transform type of the vertical transform is set to DCT-II. Any of above proposed methods of block settings can be combined. In another embodiment, the block settings can be applied to Intra and/or Inter blocks. In the following, two examples for block settings are shown for block width or height in interval [4, 16]. Note that [4, 16] can be changed to [4, 8] or [4, 32].

Example 1. The transform type for horizontal transform is changed to DST-VII when the block width is within interval [4, 16] and/or block width is smaller than or equal to block height.

Example 2. The transform type for vertical transform is changed to DST-VII when the block height is within [4, 16] and/or block height is smaller than or equal to block width.

Mode settings mean that this rule decides the transform types for the default transform depending on the selected mode. In one embodiment, this rule can depend on the Intra prediction mode. For example, in a predefined interval of directional modes, {directional modes % 2==1} is set to one combination and {directional modes % 2==0} is set to another combination. In another embodiment, the default transform mode for Intra prediction modes, that are not directional modes such as planar or DC, can be fixed at one defined combination, such as (DCT-II, DCT-II), (DST-VII, DST-VII), (FDST-VII, FDST-VII) or (DCT-VIII, DCT-VIII). In another embodiment, the default transform mode for Intra prediction modes, which are not directional modes such as planar or DC, can be toggled with other settings such as block settings. An example is shown in Table 7.

In another example for CIIP, if horizontal or horizontal-related Intra prediction mode is selected, the transform type for the horizontal transform is changed to DST-VII when the block width is within [4, 16] and/or the block width is smaller than or equal to the block height; if vertical or vertical-related Intra prediction mode is selected, the transform type for vertical transform is changed to DST-VII when the block height is within [4, 16] and/or block height is smaller than or equal to block width; and if non-angular intra prediction mode is selected, the transform type selection is shown in following examples.

Example 1. The transform type for horizontal transform is changed to DST-VII when the block width is within [4, 16] and/or block width is smaller than or equal to block height.

Example 2. The transform type for vertical transform is changed to DST-VII when the block height is within [4, 16] and/or block height is smaller than or equal to block width.

TABLE 7

An example of default transform type for horizontal transform and vertical transform.

| predModeIntra | trTypeHor | trTypeVer |
|---|---|---|
| INTRA_PLANAR, INTRA_ANGULAR31, INTRA_ANGULAR32, INTRA_ANGULAR34, INTRA_ANGULAR36, INTRA_ANGULAR37 | ( nTbW >= 4 && nTbW <= 16) ? 1 : 0 | ( nTbH >= 4 && nTbH <= 16) ? 1 : 0 |
| INTRA_DC INTRA_ANGULAR33, INTRA_ANGULAR35 | 0 | 0 |
| INTRA_ANGULAR2, INTRA_ANGULAR4, . . . , INTRA_ANGULAR28, INTRA_ANGULAR30, INTRA_ANGULAR39, INTRA_ANGULAR41, . . . , INTRA_ANGULAR63, INTRA_ANGULAR65 | (nTbW >= 4 && nTbW <= 16 ) ? 1 : 0 | 0 |
| INTRA_ANGULAR3, INTRA_ANGULAR5, . . . , INTRA_ANGULAR27, INTRA_ANGULAR29, INTRA_ANGULAR38, INTRA_ANGULAR40, . . . , INTRA_ANGULAR64, INTRA_ANGULAR66 | 0 | ( nTbH >= 4 && nTbH <= 16 ) ? 1 : 0 |

Unified settings are to apply the proposed transform settings to one particular mode or to the general cases. The general cases can include Intra blocks and/or Intra related blocks like CIIP block. In one embodiment, Table 7, which is currently used by ISP, can also be applied to other Intra mode and the existing transform settings for other Intra modes are replaced. For example, when the current block is Intra-coded, the default transform types are decided according to Table 7 instead of the existing transform settings. In another embodiment, any proposed transform settings (e.g. the example (1) or (2) for block settings) can be applied to ISP mode and the existing transform settings for ISP are replaced. For example, when the current block is coded with ISP, the default transform types are decided according to any propose transform settings (e.g. example (1) or (2) for block settings) instead of Table 7. In another embodiment, any proposed transform settings (e.g. the example (1) or (2) for block settings can also be applied to CIIP block). In another embodiment, the two kinds of existing transform settings can be combined to build a new rule for assigning the default transform mode. For example, block settings such as example (1) or (2) can be combined with mode settings such as Table 7 as Table 8. This new rule can be applied to ISP and/or other Intra mode. In another embodiment, Table 7 can be applied to decide the transform mode for CIIP block. In another embodiment, Table 8 can be applied to decide the transform mode for CIIP block.

TABLE 8

Another example of default transform type for horizontal transform and vertical transform.

| predModeIntra | trTypeHor | trTypeVer |
|---|---|---|
| INTRA_PLANAR, INTRA_ANGULAR31, INTRA_ANGULAR32, INTRA_ANGULAR34, INTRA_ANGULAR36, INTRA_ANGULAR37 | ( nTbW >= 4 && nTbW <= 16 && nTbW <= nTbH) ? 1 : 0 | ( nTbH >= 4 && nTbH <= 16 && nTbH <= nTbW) ? 1 : 0 |
| INTRA_DC, INTRA_ANGULAR33, INTRA_ANGULAR35 | 0 | 0 |
| INTRA_ANGULAR2, INTRA_ANGULAR4, . . . , INTRA_ANGULAR28, INTRA_ANGULAR30, INTRA_ANGULAR39, INTRA_ANGULAR41, . . . , INTRA_ANGULAR63, INTRA_ANGULAR65 | ( nTbW >= 4 && nTbW <= 16 && nTbW <= nTbH) ? 1 : 0 | 0 |
| INTRA_ANGULAR3, INTRA_ANGULAR5, . . . , INTRA_ANGULAR27, INTRA_ANGULAR29, INTRA_ANGULAR38, INTRA_ANGULAR40, . . . , INTRA_ANGULAR64, INTRA_ANGULAR66 | 0 | ( nTbH >= 4 && nTbH <= 16 && nTbH <= nTbW) ? 1 : 0 |

Any method or any combinations of above can be decided according to an implicit rule or an explicit rule. The implicit rule can depend on the block width, height, area, block size aspect ratio, color component, or picture type. The explicit rule can be indicated by signaling a flag at CU, CTU, slice, tile, tile group, picture, SPS (Sequence Parameter Set), PPS (Picture Parameter Set) level, or etc. Any method or any combinations of above can be applied to Intra or Inter or CIIP mode.

Any of the foregoing proposed methods can be implemented in encoders and/or decoders. For example, any of the proposed methods can be implemented in a transform module of an encoder, and/or a transform module of a decoder. Alternatively, any of the proposed methods can be implemented as a circuit coupled to the transform module of the encoder and/or the transform module of the decoder, so as to provide the information needed by the transform module. For example, the proposed method can be implemented in an inter prediction module of an encoder, and/or an inter prediction module of a decoder. For example, the proposed method can be implemented in an intra prediction module of an encoder, and/or an intra prediction module of a decoder.

Any combination of above can be applied to any tools such as Intra modes, Intra-related modes, CIIP or TPM.

Figure 8:
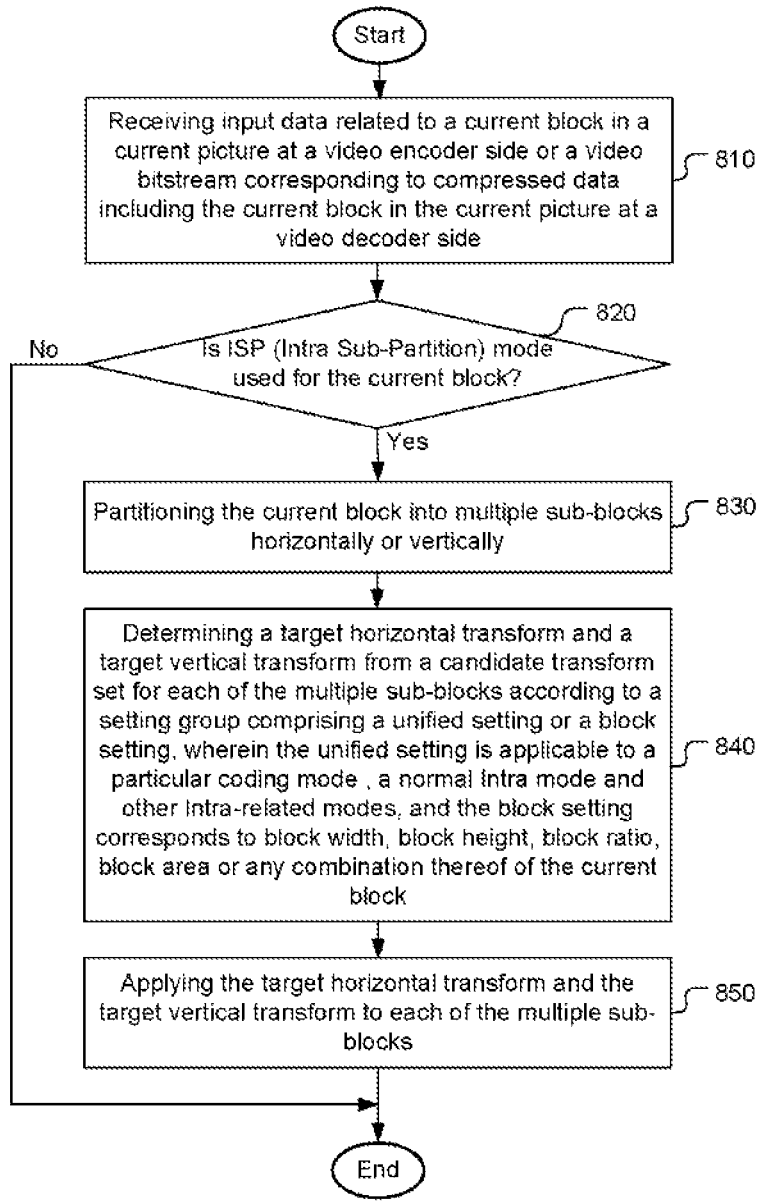
FIG. 8 illustrates a flowchart of an exemplary prediction for video coding according to an embodiment of the present invention, where the horizontal and vertical transforms for each sub-block partitioned by ISP (Intra Sub-Partition) are determined according to a target setting belonging to a setting group comprising unified setting and block setting.

FIG. 8 illustrates a flowchart of an exemplary prediction for video coding according to an embodiment of the present invention, where a target horizontal transform and a target vertical transform are determined from a candidate transform set for each of the multiple sub-blocks according to a target setting. The steps shown in the flowchart, as well as other following flowcharts in this disclosure, may be implemented as program codes executable on one or more processors (e.g., one or more CPUs) at the encoder side and/or the decoder side. The steps shown in the flowchart may also be implemented based hardware such as one or more electronic devices or processors arranged to perform the steps in the flowchart. According to this method, input data related to a current block in a current picture is received at a video encoder side or a video bitstream corresponding to compressed data including the current block in the current picture is received at a video decoder side in step 810. Whether the Intra Sub-Partition (ISP) mode is used for the current block is determined in step 820. If the ISP mode is used for the current block (i.e., the "Yes" path from step 820), steps 830 and 850 are performed. Otherwise (i.e., the "No" path from step 820), steps 830 and 850 are skipped. In step 830, the current block is partitioned into multiple sub-blocks horizontally or vertically. In step 840, a target horizontal transform and a target vertical transform are determined from a candidate transform set for each of the multiple sub-blocks according to a setting group comprising a unified setting or a block setting, wherein the unified setting is applicable to a particular coding mode, a normal Intra mode and other Intra-related modes, and the block setting corresponds to block width, block height, block ratio, block area or any combination thereof of the current block. In step 850, the target horizontal transform and the target vertical transform are applied to each of the multiple sub-blocks.

Figure 9:
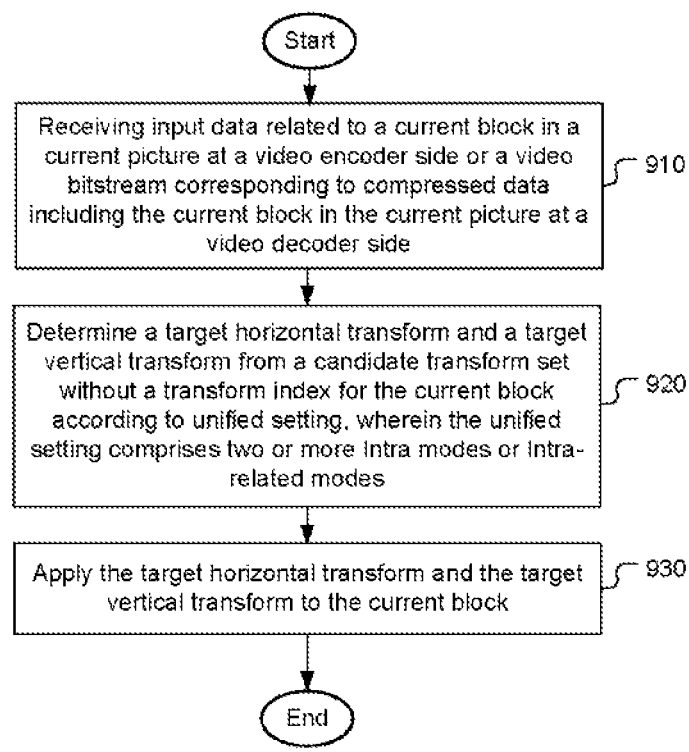
FIG. 9 illustrates a flowchart of another exemplary prediction for video coding according to an embodiment of the present invention, where a target horizontal transform and a target vertical transform are determined from a candidate transform set without a transform index for the current block according to unified setting when the unified setting comprises two or more Intra modes or Intra-related modes.

FIG. 9 illustrates a flowchart of another exemplary prediction for video coding according to an embodiment of the present invention, where a target horizontal transform and a target vertical transform are determined from a candidate transform set without a transform index for the current block according to unified setting when the unified setting comprises two or more Intra modes or Intra-related modes. According to this method, input data related to a current block in a current picture are received at a video encoder side or a video bitstream corresponding to compressed data including the current block in the current picture is received at a video decoder side in step 910. A target horizontal transform and a target vertical transform are determined from a candidate transform set without a transform index for the current block according to unified setting in step 920, wherein the unified setting comprises two or more Intra modes or Intra-related modes. The target horizontal transform and the target vertical transform are applied to the current block in step 930.

The flowchart shown is intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of prediction for video coding, the method comprising:
   receiving input data related to a current block in a current picture at a video encoder side or a video bitstream corresponding to compressed data including the current block in the current picture at a video decoder side;
   if Intra Sub-Partition (ISP) mode is used for the current block:
   partitioning the current block into multiple sub-blocks horizontally or vertically;
   determining a target horizontal transform and a target vertical transform from a candidate transform set for each of the multiple sub-blocks according to a setting group comprising a unified setting, a block setting, or both, wherein the unified setting is applicable to a particular coding mode, and a normal Intra mode, and the block setting corresponds to block width, block height, block ratio, block area or any combination thereof of the sub-block; and
   applying the target horizontal transform and the target vertical transform to each of the multiple sub-blocks,
   wherein the ISP mode is disabled according to at least one threshold, the disabling being related to block width, block height, or block area of the current block.

2. The method of claim 1, wherein the target horizontal transform and the target vertical transform belong to a subset comprising any combination of DCT-II, DST-VII, DCT-VIII, and flipped DST-VII.

3. The method of claim 2, wherein a pair representing (the target horizontal transform, the target vertical transform) corresponds to (DCT-II, DCT-II), (DST-VII, DCT-II), (DCT-II, DST-VII), or (DST-VII, DST-VII).

4. The method of claim 1, wherein the target horizontal transform and the target vertical transform are determined based on the block width, the block height, the block ratio, the block area or any combination thereof of the current block.

5. The method of claim 4, wherein the target horizontal transform is changed from DCT-II to another transform type when the block width is smaller than or equal to the block height.

6. The method of claim 4, wherein the target horizontal transform is changed from DCT-II to DST-VII when the block width is within [4, 16], the block width is smaller than or equal to the block height, or both the block width is within [4, 16] and the block width is smaller than or equal to the block height.

7. The method of claim 4, wherein the target vertical transform is changed from DCT-II to DST-VII when the block height is within [4, 16], the block height is smaller than or equal to the block width, or both the block height is within [4, 16] and the block height is smaller than or equal to the block width.

8. The method of claim 1, wherein the candidate transform set is the same as a transform set for the normal Intra mode.

9. The method of claim 8, wherein a shortest codeword for candidate transforms in the candidate transform set is set to DST-VII for both the target horizontal transform and the target vertical transform.

10. The method of claim 1, wherein the ISP mode uses a same Intra prediction mode list as that of the normal Intra mode.

11. The method of claim 10, wherein the ISP mode uses a subset of an Intra prediction mode list of the normal Intra mode.

12. The method of claim 1, wherein the unified setting or the block setting is determined implicitly.

13. The method of claim 1, wherein a decision for the unified setting or the block setting is signaled at CU (coding unit), CTU (coding tree unit), slice, tile, tile group, SPS (sequence parameter set), or PPS (picture parameter set) level.

14. The method of claim 1, wherein the setting group further comprises mode setting and the mode setting corresponds to a selected Intra mode for the current block.

15. The method of claim 14, wherein the selected Intra mode corresponds to a directional mode satisfying (directional modes % 2==1).

16. The method of claim 14, wherein the selected Intra mode corresponds to a directional mode satisfying (directional modes % 2==0).

17. An apparatus of video coding, the apparatus comprising one or more electronic circuits or processors arranged to:
   receive input data related to a current block in a current picture at a video encoder side or a video bitstream corresponding to compressed data including the current block in the current picture at a video decoder side;
   if Intra Sub-Partition (ISP) mode is used for the current block:
   partition the current block into multiple sub-blocks horizontally or vertically;
   determine a target horizontal transform and a target vertical transform from a candidate transform set for each of the multiple sub-blocks according to a setting group comprising a unified setting, a block setting, or both, wherein the unified setting is applicable to a particular coding mode, and a normal Intra mode, and the block setting corresponds to block width, block height, block ratio, block area or any combination thereof of the sub-block; and apply the target horizontal transform and the target vertical transform to each of the multiple sub-blocks, wherein the ISP mode is disabled according to at least one threshold, the disabling being related to block width, block height, or block area of the current block.

18. A method of prediction for video coding, the method comprising:

receiving input data related to a current block in a current picture at a video encoder side or a video bitstream corresponding to compressed data including the current block in the current picture at a video decoder side;

determining a target horizontal transform and a target vertical transform from a candidate transform set without a transform index for the current block according to unified setting, wherein the unified setting comprises two or more Intra modes or Intra-related modes; and applying the target horizontal transform and the target vertical transform to the current block, wherein the ISP mode is disabled according to at least one threshold, the disabling being related to block width, block height, or block area of the current block.

19. An apparatus of video coding, the apparatus comprising one or more electronic circuits or processors arranged to:

receive input data related to a current block in a current picture at a video encoder side or a video bitstream corresponding to compressed data including the current block in the current picture at a video decoder side;

determine a target horizontal transform and a target vertical transform from a candidate transform set without a transform index for the current block according to unified setting, wherein the unified setting comprises two or more Intra modes or Intra-related modes; and apply the target horizontal transform and the target vertical transform to the current block, wherein the ISP mode is disabled according to at least one threshold, the disabling being related to block width, block height, or block area of the current block.

20. The method of claim 1, wherein when the block width or the block height of the current block is larger than a maximum threshold, or the block size is smaller than a minimum threshold, the ISP mode is disabled.

21. The method of claim 20, wherein the maximum threshold is a maximum transform block size.

22. The method of claim 20, wherein the minimum threshold is a square of minimum transform block size.

* * * * *